(12) United States Patent
Malykke

(10) Patent No.: US 7,464,888 B2
(45) Date of Patent: Dec. 16, 2008

(54) AUTOMATIC DOSAGE UNIT

(76) Inventor: Torben Malykke, Bygaden 35, DK-2625 Vallensbaek (DK)

( * ) Notice: Subject to any disclaimer, the term of this patent is extended or adjusted under 35 U.S.C. 154(b) by 100 days.

(21) Appl. No.: 10/577,892

(22) PCT Filed: Dec. 22, 2004

(86) PCT No.: PCT/DK2004/000912

§ 371 (c)(1), (2), (4) Date: Apr. 28, 2006

(87) PCT Pub. No.: WO2005/063100

PCT Pub. Date: Jul. 14, 2005

(65) Prior Publication Data

US 2007/0034088 A1    Feb. 15, 2007

(30) Foreign Application Priority Data

Dec. 27, 2003 (DK) ................................ 2003 01939
Aug. 11, 2004 (DK) ................................ 2004 01217

(51) Int. Cl.
  *B02C 25/00* (2006.01)
(52) U.S. Cl. .................... 241/36; 141/360; 241/100; 241/101.2; 241/37.5
(58) Field of Classification Search ................. 241/100, 241/36, 34, 101.2, 30, 37.5; 141/360
See application file for complete search history.

(56) References Cited

U.S. PATENT DOCUMENTS

| | | | |
|---|---|---|---|
| 4,202,387 A | * | 5/1980 | Upton ...................... 141/360 |
| 4,437,499 A | | 3/1984 | Devale et al. |
| 5,522,556 A | | 6/1996 | Knepler et al. |
| 6,349,889 B1 | | 2/2002 | Sandolo |
| 6,465,035 B1 | | 10/2002 | Knepler |

FOREIGN PATENT DOCUMENTS

| | | | |
|---|---|---|---|
| DE | 4333043 | | 4/1995 |
| DE | 19832413 | * | 1/2000 |
| FR | 2605206 | | 4/1988 |
| GB | 1218611 | | 1/1971 |
| JP | 3-297426 | * | 12/1991 |

* cited by examiner

*Primary Examiner*—Mark Rosenbaum
(74) *Attorney, Agent, or Firm*—Fitch, Even, Tabin & Flannery

(57) ABSTRACT

Automatic dosage unit comprising storage unit, conic grinder driven by a motor, identification unit, funnel, fastener, and locking device, arranged to grind a programmed amount of a given product directly into a specific collection unit. E.g. in connection with the storage unit being filled with coffee beans, a caffetier is inserted into the fastening mechanism, whereupon the dosage unit automatically registers the size of the caffetier and a pre-programmed amount of coffee is ground directly into the caffetier. The new in this invention is that it can identify the size of the collection unit, that the product is ground directly into the collection unit by means of a hollow drive shaft, that the storage unit is opened upon installation and closed upon de-installation, as well as that the collection unit is fastened by the dosage unit for the entire duration of the grinding process.

29 Claims, 10 Drawing Sheets

AUTOMATIC DOSAGE UNIT

TECHNICAL FIELD OF THE INVENTION

The present invention relates to an automatic dosage unit for dosage of a product into a collection unit. The invention further relates to a storage unit for said dosage unit as well as an use of the dosage unit.

BACKGROUND ART

Dosage units for dosage of different products are known, where the product is either pre-prepared or is being prepared in relation to the dosage itself.

Particularly in reference to, the product being a food stuff, such as for example coffee, some disadvantages with the known dosage units have been shown. These dosage units could for example be coffee grinders or mills, which are adjusted to prepare i.e. grind coffee beans for use in the making of the finished coffee drink.

In recent years there has been a tendency towards coffee and coffee drinking becoming more and more popular and people often enjoy a good cup of coffee in a café or in specialized 'Coffee Houses'. Coffee drinking has simply become a gourmet experience.

Simultaneously with this popularity increase a need has arisen for the cafés and in domestic homes alike to treat the coffee optimally from a taste point of view. This primarily viewed in light of the fact that the coffee can get a bitter taste, if it is not fresh.

It has proven particularly advantageous that, provided one grinds the coffee beans immediately before these are to be used for brewing, a good taste is achieved.

The coffee bean contains ethereal oils, which after grinding will commence an oxidation. It is by this oxidation the coffee becomes bitter. This means, the more time that passes from grinding of the coffee beans to the use of these the greater the likelihood is for a bitter taste. It must be said, that ground coffee is often sold vacuum packed for the same reason.

It has thus been shown that the storage of the ground coffee gives deterioration of the taste. In contrast to this storage of whole coffee beans does not give the same deterioration in taste as the ethereal oils lie trapped in the coffee bean itself.

A further disadvantage regarding storage of the freshly ground coffee is that it has a greasy consistency by which receptacles, magazines or storage units quickly become greasy. The ethereal oils in this greasy surface will, similar to the rest of the freshly ground coffee, oxidize after a while, which deteriorates the taste of the coffee, as mentioned above. The old coffee, which sticks to these surfaces, gives off some of the deteriorated taste to the surrounding fresh coffee.

It has furthermore been shown that if the freshly ground coffee can get in direct contact with edges or pockets where the freshly ground coffee can (and likely will) stick, this coffee can at a later point in time loosen and be used in the brewing itself. This will result in a significant deterioration in the coffee, which is served to the user.

With the aforementioned popularity increase a need has arisen for the ability to prepare coffee beans and use these immediately hereafter without the freshly ground coffee on the whole coming into contact with surfaces inside receptacles or storage units.

It is becoming normal to serve caffetier coffee in domestic homes as well as in cafés and restaurants. In the homes freshly ground coffee is often used, which has been prepared immediately before the dosage into the caffetier. This domestic coffee grinder or mill has the same disadvantages concerning the freshly ground coffee sticking to the grinder and often the user does not clean the grinder correctly whereby the taste deteriorates. Moreover there is the recurring problem regarding how much coffee should be used for the caffetier in question i.e. how strong should the finished coffee be.

In cafés today there are coffee grinders, which are suited for espresso coffee. In those the grinding is very fine and therefore cannot be used for caffetiers. Often this results in the cafés using ground coffee over freshly ground coffee for the caffetiers. Again there are the disadvantages with the dosage.

Thus, the matter is that all existing coffee grinders require that the person using the coffee grinder first identifies the size of the caffetier, in which the coffee is to be made, then manually estimates the amount of coffee beans which should be ground in order to obtain the sufficient volume of coffee for the caffetier in question as well as finally that the person using the coffee grinder transfers the ground coffee beans to the caffetier.

All existing coffee grinders on the market have furthermore the fundamental problem that the freshly ground coffee is not dosed directly into the caffetier in which the coffee is to be used. In any event, there is some form of storage, which causes the ethereal oils, which are present in freshly ground coffee, to oxidize and the coffee thereby being perceived as "bitter". Any form of storage of the ground coffee will therefore result in deterioration of the taste.

SUMMARY OF THE INVENTION

The object of the present invention is thus to provide an automatic dosage unit, which solves the aforementioned disadvantages and problems with the prior art.

In addition it is an object of the present invention to provide an automatic dosage unit, which through identifying the size of a given receptacle can dose a predetermined amount of a given product.

Furthermore it is an object of the present invention to provide an automatic dosage unit, which can prepare a product directly and dose the same.

It is also an object of the present invention to provide an automatic dosage unit which has a short and direct route for the product to be dosed and which decreases the product's contact with surfaces during dosage.

A further object of the present invention is to provide an automatic dosage unit, which has a short distance between grinding device and collection unit.

Moreover it is an object of the present invention to provide an automatic dosage device, which enables monitoring and controlling consumption of the product.

There is equally an object with the present invention to provide an automatic dosage unit, which enables a storage unit to be locked to a dosage unit.

Moreover it is an object with the present invention to provide an automatic dosage unit which enables adjustment of preparation of a product to be dosed.

It is also an object with the present invention to provide an automatic dosage unit in which the noise during preparation of a product is significantly reduced.

The automatic dosage unit according to the present invention is new and characterized in that it comprises an identification device, which is arranged to identify the size of the collection unit and on this basis dose a predetermined amount of the product.

By this identification the possibility of using a plurality of various sizes of the collection unit is achieved as the dosage can be performed in the correct amount in relation to the size of the collection unit.

The invention provides a dosage unit as specified in the introduction but which recognizes the size of the collection unit.

It must be mentioned that in the following the dosage unit will primarily be described in relation to dosage and preparation of coffee, but within the idea of the invention equally it could be used for other products where the dosage of a predetermined amount to a specific size is essential for the end product.

According to a preferred embodiment of the invention the identification device may comprise a control unit to control the dosage amount of the product in relation to the size of the collection unit. The control unit facilitates a fast and precise dosage of the product for the collection unit and hereby assists with the correct dosage amount in relation to the identified collection unit.

The identification device may advantageously comprise a fastening device to receive and fasten the collection unit during dosage of the product. It is hereby possible for the user of the dosage unit to attach the collection unit during the automatic dosage and for example carry out other tasks in the meantime.

According to a preferred embodiment according to the invention the dosage unit may comprise a storage unit for storage of the product so that the dosage unit thereby easily can contain an amount of the product and thus reduce refill time. In addition the product may be stored in this storage unit in a suitable way, for example the coffee beans could be hermetically sealed in whereby the taste in the beans is retained for longer than for example in an open bag. One could with advantage have several storage units, which contain different products for example different coffee beans so that they could easily be exchanged for the desired taste.

In an expedient way the dosage unit may, according to the invention, comprise a grinding device, which is arranged to prepare, i.e. grind or mill, the product. It is thereby possible to prepare the product immediately prior to dosage into the collection unit. The grinding device is used to comminute the product whereby the dosed product, such as coffee beans, is ready for mixing with water.

According to preferred embodiment of the invention the milling device may consist of a set of conic knives comprising an outer conic knife, which mainly is funnel-shaped, and an inner conic knife which in the main is cone-shaped. Use of conic knife set has been shown to produce a very effective grinding of for example coffee beans, which is of great importance to the final taste experience. Experience shows that this type of grinding does not remove a lot of taste from the coffee beans as this type of grinding provide a quick and consistent grinding of the coffee beans.

The outer conic knife may advantageously be arranged to rotate around the inner knife. It is thus possible that the collection unit can be placed directly below the knife set and that the storage unit can similarly be placed above the knife set there as avoiding a drive shaft to the inner knife, which in the known devices take up so much space that an optimum route of the product is difficult. In this embodiment of the invention the product is moved easily by means of its weight from e.g. the storage unit to the knife set and after grinding in the knife set directly down into the collection unit, that is, a direct and short route. It is further more obtained that the product is in least possible contact with the surfaces of the dosage unit during the dosage itself. This minimal contact minimizes the risk of the product sticking to the surface of the dosage unit and thereby the prepared coffee beans may potentially oxidize and become bitter which is particularly the case of the known coffee grinders.

It has furthermore proved expedient that there is a play between the inner knife and the outer knife; such play facilitates the product to move down through the conic knife set and into the collection unit during the preparation of the product.

According to an embodiment of the invention an adjustment means may be arranged to adjust the degree of preparation of the product, that is adjusting the play between the knives. Through variation in the play it is thereby possible to vary the granularity of the finished ground product and thereby to adjust the machine for various types of products.

A driving device may advantageously be arranged to rotate the outer knife. In an embodiment of the present invention the driving device is a motor which rotates the outer knife around the inner knife. The motor is placed deaxially in relation to the centre of the knife set and drives the outer knife via a transfer of power, for example a belt drive.

It has furthermore proven advantageous according to the invention if a control unit is arranged in connection with the driving device whereby the speed of rotation may be changed and thereby the preparation time of the product. This is particularly useful regarding grinding of coffee beans, as coffee beans may vary in hardness, type, roasting etc. How the grinding process has taken place can therefore be of great importance for the final taste experience of the coffee. A further advantage is that the rotation speed of the outer knife may be adjusted to the desired noise level.

The storage unit may advantageously be mounted onto the dosage unit itself and dismounted from same by a rotary motion. It is thereby obtained that the storage unit may be exchanged quickly and easily.

A locking device may advantageously be arranged to lock the storage unit to the dosage unit. This is particularly useful if the dosage unit is placed in a public place or where an authorized user wishes to secure the content of the storage unit against theft. The value of the content of a 3-liter storage unit be of high value, especially in the case of coffee beans. Hereby can e.g. a café owner, who has installed a dosage unit according to the invention, decrease the risk of waste loss and theft.

According to an embodiment of the invention a locking device may be positioned between the storage unit and an inlet to the conic knife set. By this position a compact unit is obtained and likewise a direct route from the storage unit to the knife set.

Furthermore it may be advantageous if a safety device is arranged to prevent movement of the driving device in the event the storage unit is removed from the dosage unit. Such safety device provides the advantage that the dosage unit's storage units may be changed by non-authorized users, with great safety.

It has proven particularly advantageous according to the invention if the identification of the collection unit is provided by means of a strain gauge, micro switch, optical sensor, weighing cell, photo identification, telemeter or the like. Thereby facilitating very precise identification of the size of collection unit and minimizing the risk of manual error. It is also possible that the dosage unit may be set-up for identification of many sizes of collection units.

In an embodiment according to the invention the closing device may comprise at least one opening and at least one blocking device in a way that the closing device can dose different amounts of the product by varying the size of the opening by means of the blocking device. This variation of the size of the opening depends upon the size of the collecting unit, which the dosage unit has identified. The precise predetermined amount relevant for the given collecting unit is hereby dosed.

It has furthermore proven advantageous, that the blocking device is arranged to hermetically block the opening of the closing device.

In a particularly preferred embodiment the dosage unit may comprise means for suppressing vibrations. It is hereby obtained, that the noise level associated with preparation of the product can be minimized to a level acceptable for the human ear. This is especially relevant for cafés, where the noise level associated with e.g. coffee grinders according to the prior art is very high and thereby a nuisance for patrons of the café.

According to another preferred embodiment of the invention a guiding device such as a funnel may be arranged to lead the product to the collection unit. Such a funnel is guiding the product thereby leading it as quickly as possible down into the collection unit and thereby assisting with a more precise dosage. Moreover it can be the case that the funnel may assist with directing the collection unit when attaching the collection unit to the dosage unit prior to the identification, which will be described in more detail in the following.

It has also proven advantageous if the dosage unit according to the invention is provided with an anti-static effect in a way that the product is mainly dosed without sticking to the unit.

In a preferred embodiment the anti-static effect may be provided in the shape of an outlet from the knives to the funnel in a way that the product is ensured a flow whereby the product is discharged on the way to the collection unit. It is during the grinding itself the coffee can be charged due to friction. The overall charge after grinding is still zero but the electrons are unevenly distributed so that there are many ions and it is those, which provide the 'stickiness'. As long as good 'stirring' of the coffee is ensured the electrons will again distribute 'nicely' whereby the coffee no longer 'sticks'.

The anti-static effect may also be provided by surface treating the areas, with which the product is in contact. These surface treatments may e.g. comprise polishing, eloxation or application of a coating.

Also, according to an embodiment of the invention a positioning device may be arranged to ensure that the collection unit is placed in a predetermined position, in which the prepared product is dosed. Hereby human errors are minimized such as, the collection unit is not held correctly during the identification of the collection unit's size and the collection unit is easy to place.

According to an advantageous embodiment of the invention a memory unit may be arranged to store information regarding the operation of the dosage unit. Hereby is obtained that the consumption of the product may be monitored in a way that the user is alerted in good time of the requirement to add a new amount of the product. Moreover the memory device may control the driving device as well as the identification device itself. A function to monitor how many times the product has been dosed and in which amounts may also be incorporated into the memory device.

The invention also concerns a storage unit, which comprises a closing device. It is thereby possible for the user to e.g. keep different types of coffee in different storage units in a way that for example a café owner can serve different types of coffee without the need for multiple dosage units. Here the user would easily take one storage unit off and attach another.

BRIEF DESCRIPTION OF THE DRAWINGS

The invention will be described in more detail below with reference to especially preferred embodiments and the drawing, in which.

All the figures are highly schematic and not necessarily to scale, and they show only parts which are necessary in order to elucidate the invention, other parts being omitted or merely suggested.

DETAILED DESCRIPTION OF THE INVENTION

Figure 1:
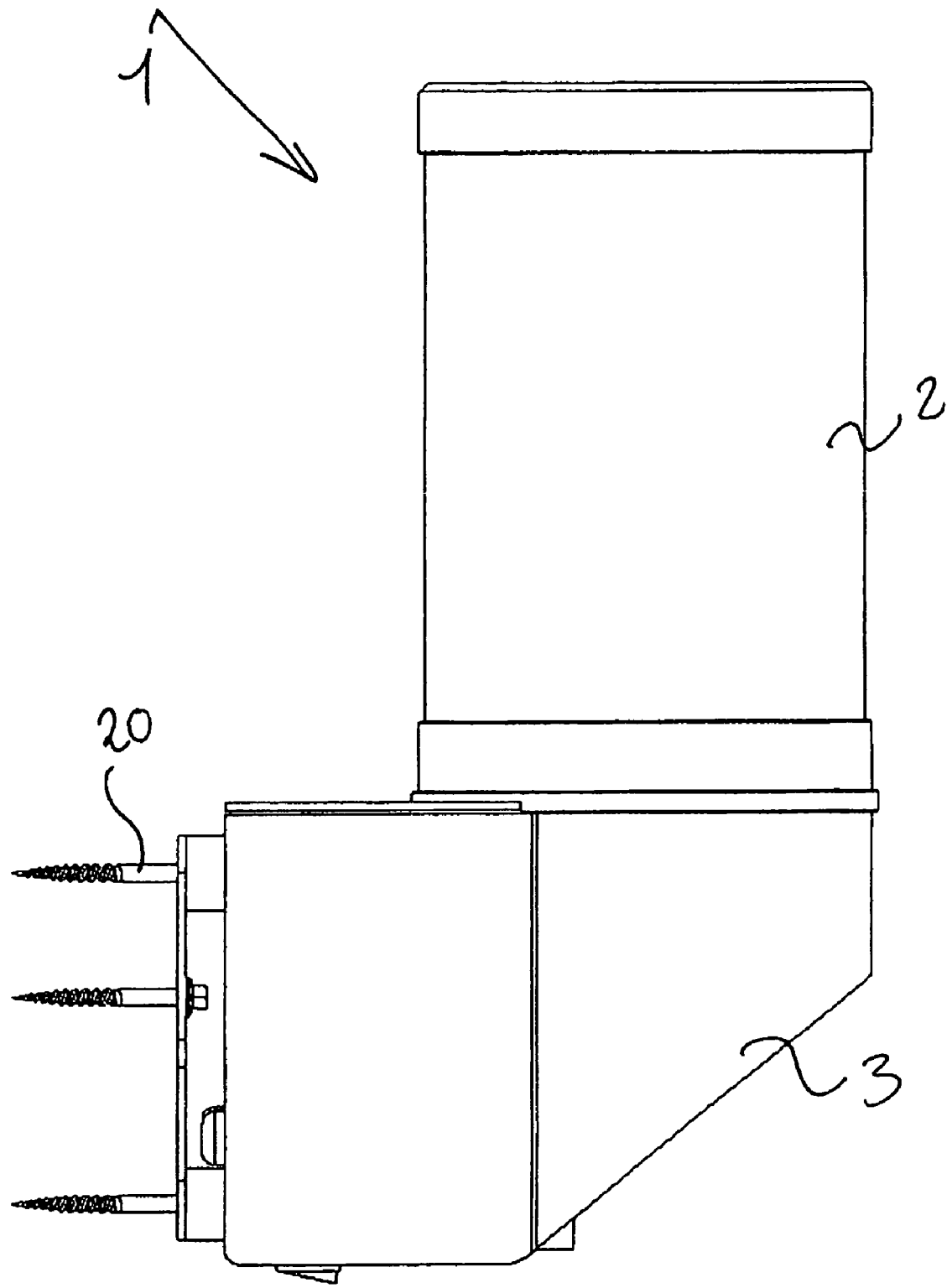
FIG. 1 is a side view of an automatic dosage unit according to the invention.

FIG. 1 shows an automatic dosage unit 1 according to the present invention, which is shown ready for mounting to a wall or similar by means of the attachment devices 20. Within the idea of the invention the dosage unit may also be adapted to be free standing on a table. The dosage unit is here shown mounted with a storage unit 2 for storage of the product for dosage.

Figure 2:
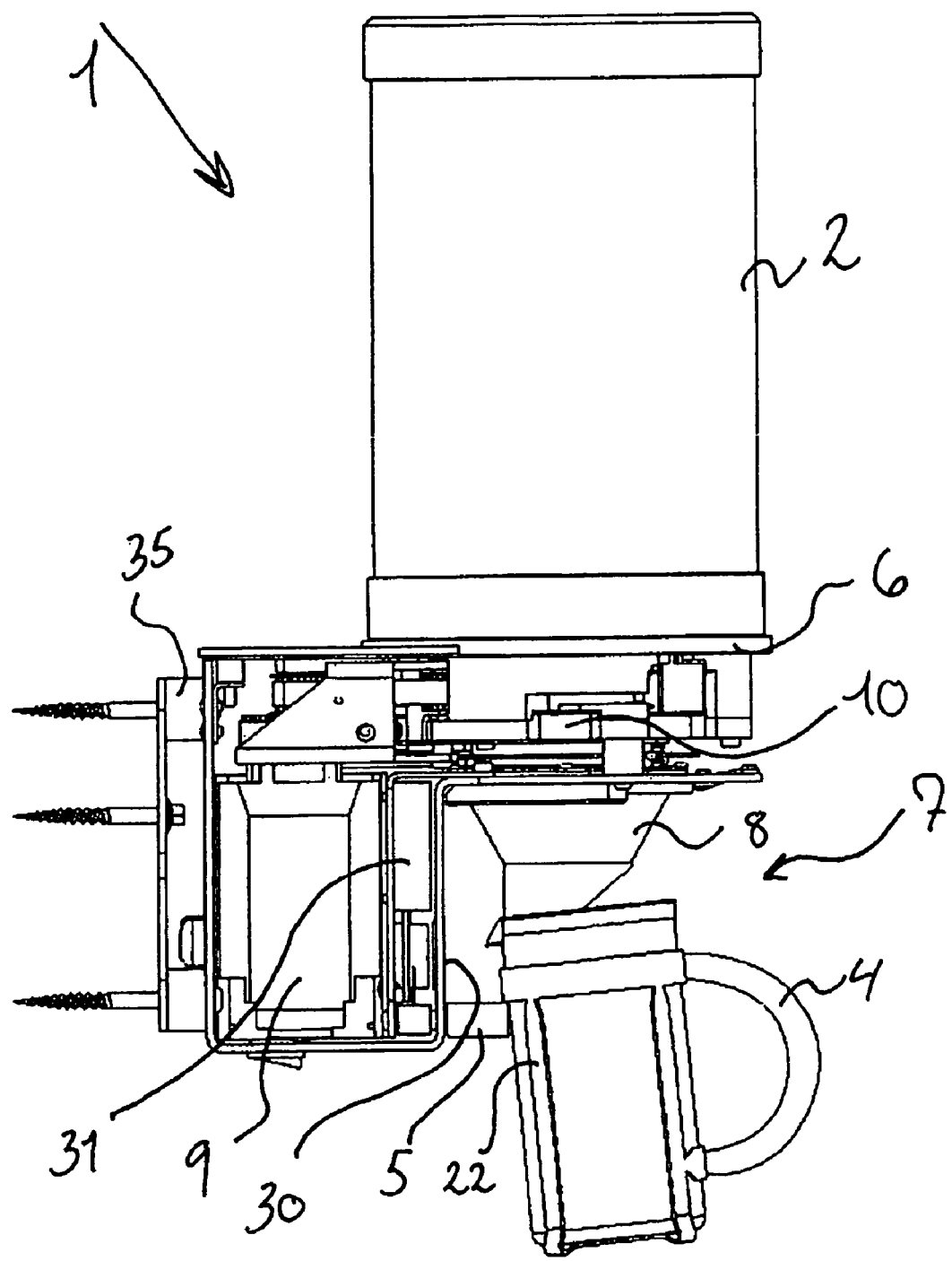
FIG. 2 is a view of the dosage unit where a section of the house has been removed and showing a collection unit placed.

Additionally in FIG. 2 is shown an automatic dosage unit holding a collection unit 4 where the cover or house 3 is removed so that the internal parts of the dosage unit 1 are exposed. The dosage unit comprise an identification device 5, which is arranged to identify the size of the collection unit. This facilitates dosage of a product in different amounts, these amounts are determined by the size of the collection unit 4.

The collection unit 4 is here shown in the form of a well-known caffetier 4, which is primarily used for the making of coffee. In this embodiment the identification device 5 is shown as assisting with the holding of the caffetier 4 and thereby encompassing a fastening device 7 to receive and fasten the collection unit during the dosage of the product. It is in this way the case that the caffetier's 4 frame 22, which can be made of metal, is resting on top of the identification unit 5 and is connected to the inside of the edge and the funnel 8, which is further detailed in the following section.

As mentioned previously, the fastening device 7 comprises also a guiding device 8, here shown as a funnel, which is arranged to lead the product to the collection unit and which together with the identification unit 5 fastens the collection unit 4. Obtained hereby is a simple and user-friendly way of placing the caffetier.

In other embodiments not shown the caffetier may be placed by means of a magnet; a bracket which grips around the caffetier; a device whereby the caffetier is held in position between two bars; a shelf, which can be moved vertically up and down; a number of hooks catching the frame of the caffetier and locks it down either by its own weight or by a spring, or other similar methods.

Next to the fastening device the automatic dosage unit is shown comprising a driving device 9, which is arranged to drive a grinding device 10. The grinding device 10 is here shown placed between the collection unit 4 and the closing device 6.

In FIG. 2 a means 35 of suppressing vibration is shown. These may for example consist of a rubber washer, which absorbs the vibrations from the driving device as well as the knives during operation, as to reduce the noise level. It is also the case that the primary means of decreasing vibration are arranged such as the driving device may swing in relation to the cover, which would be appreciated by a person skilled in the art. Moreover it is the case that washers, preferably of rubber, are placed in the space between where the driving device is arranged and the cover so that the driving device is hermetically sealed to avoid airborne noise.

Figure 3:
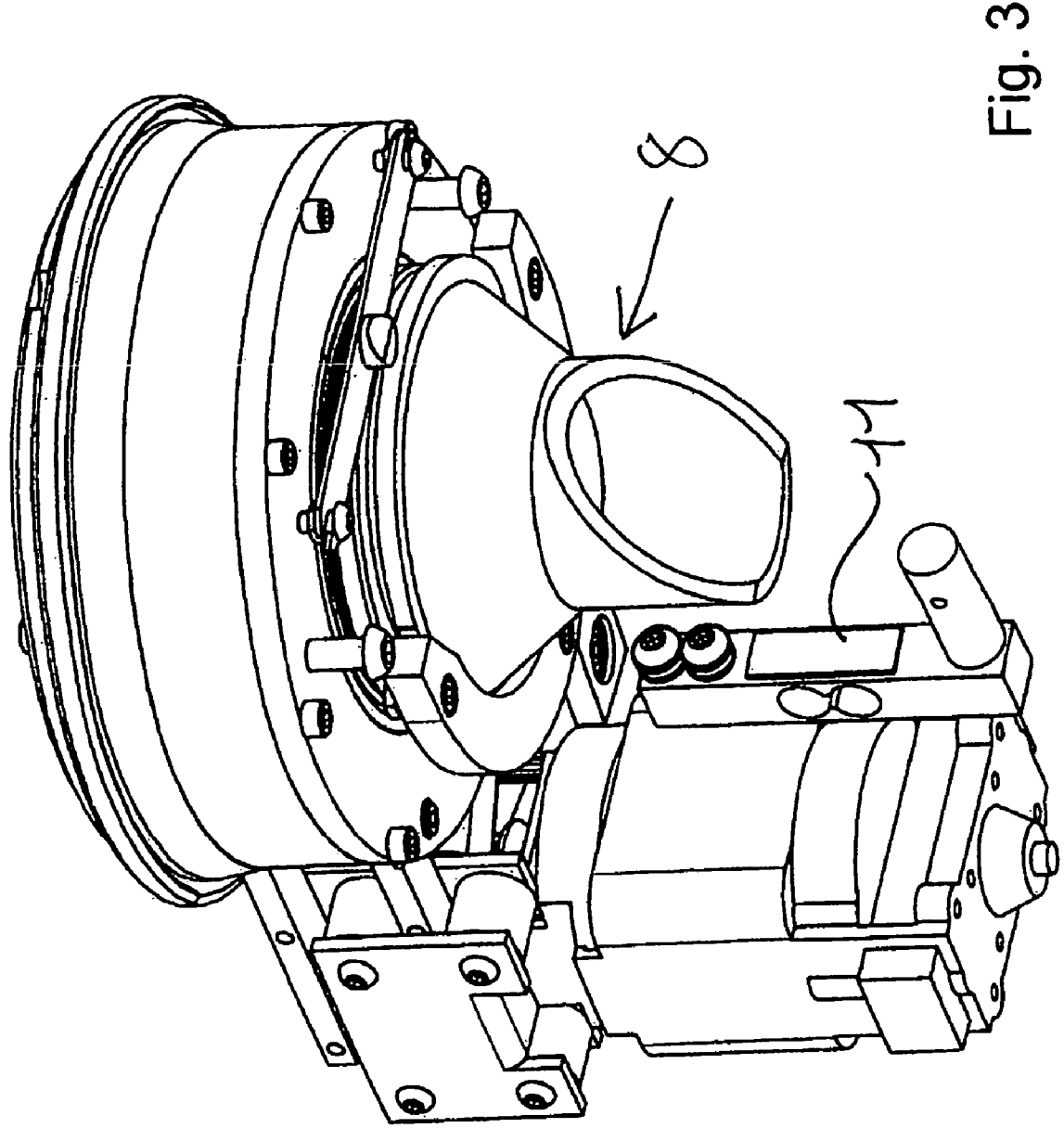
FIG. 3 shows in perspective a part of the dosage unit viewed diagonally from below

FIG. 3 shows the identification of the caffetier's 4 sizes are provided by means of a load cell 11, which in other embodiments may be in the shape of a micro switch, optical sensor, strain gauge, photo identification, telemeter, or similar. FIG. 2 shows how the caffetier is placed and where the funnel 8 reaches down into the caffetier to provide a fixed basis for the identification and where the caffetier frame is held up by the identification device 5. After the caffetier is placed in the dosage unit the caffetier is released by the user after which the caffetier may be identified. The caffetier is identified by the caffetier's own weight pressing down on the identification device 5, and thereby sends a signal, which is interpreted electronically and thereby controls how much is dosed depending on and in suited to the size of the collection unit.

Figure 4:
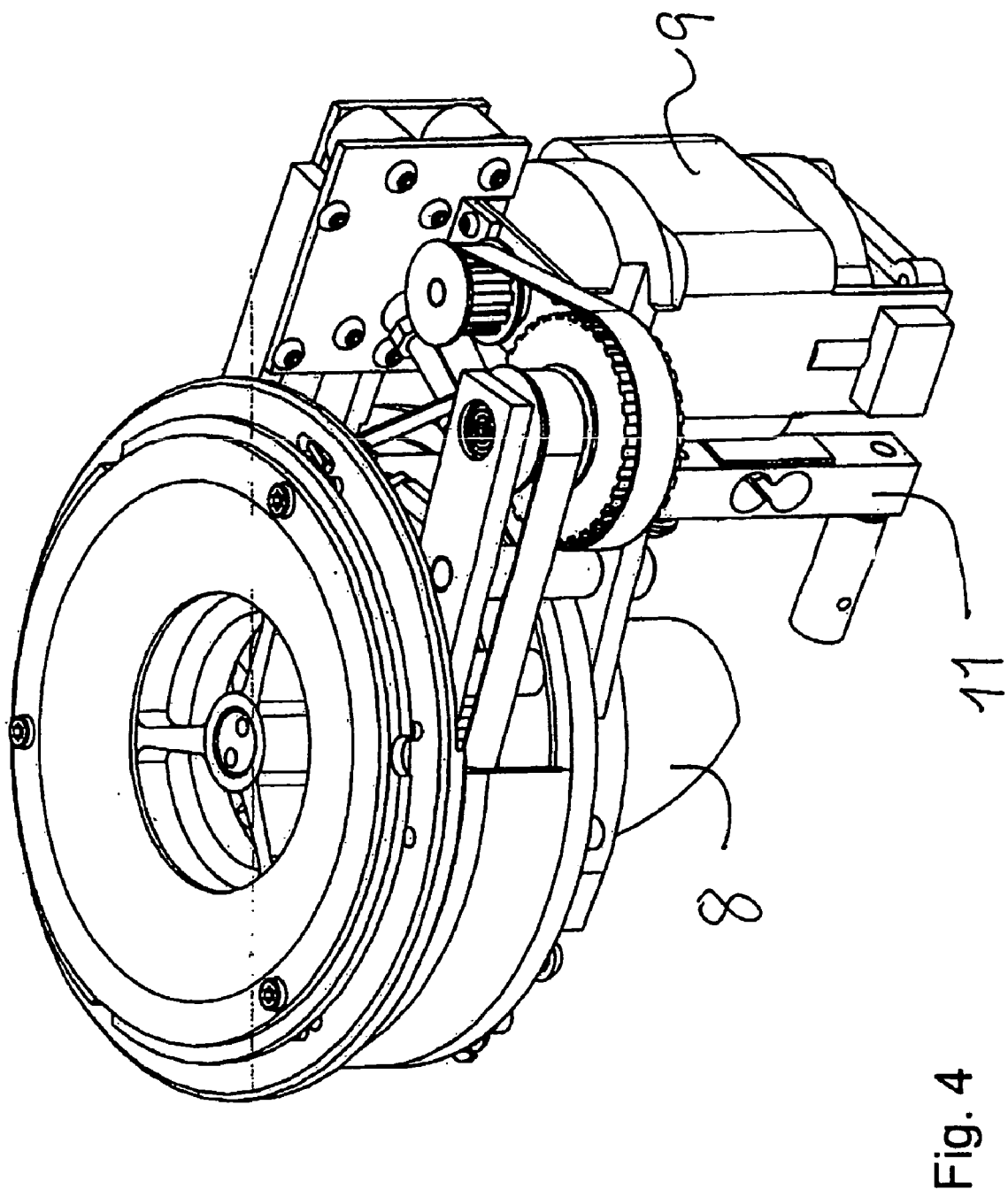
FIG. 4 shows in perspective the part from FIG. 3 viewed diagonally from above.
Figure 5:
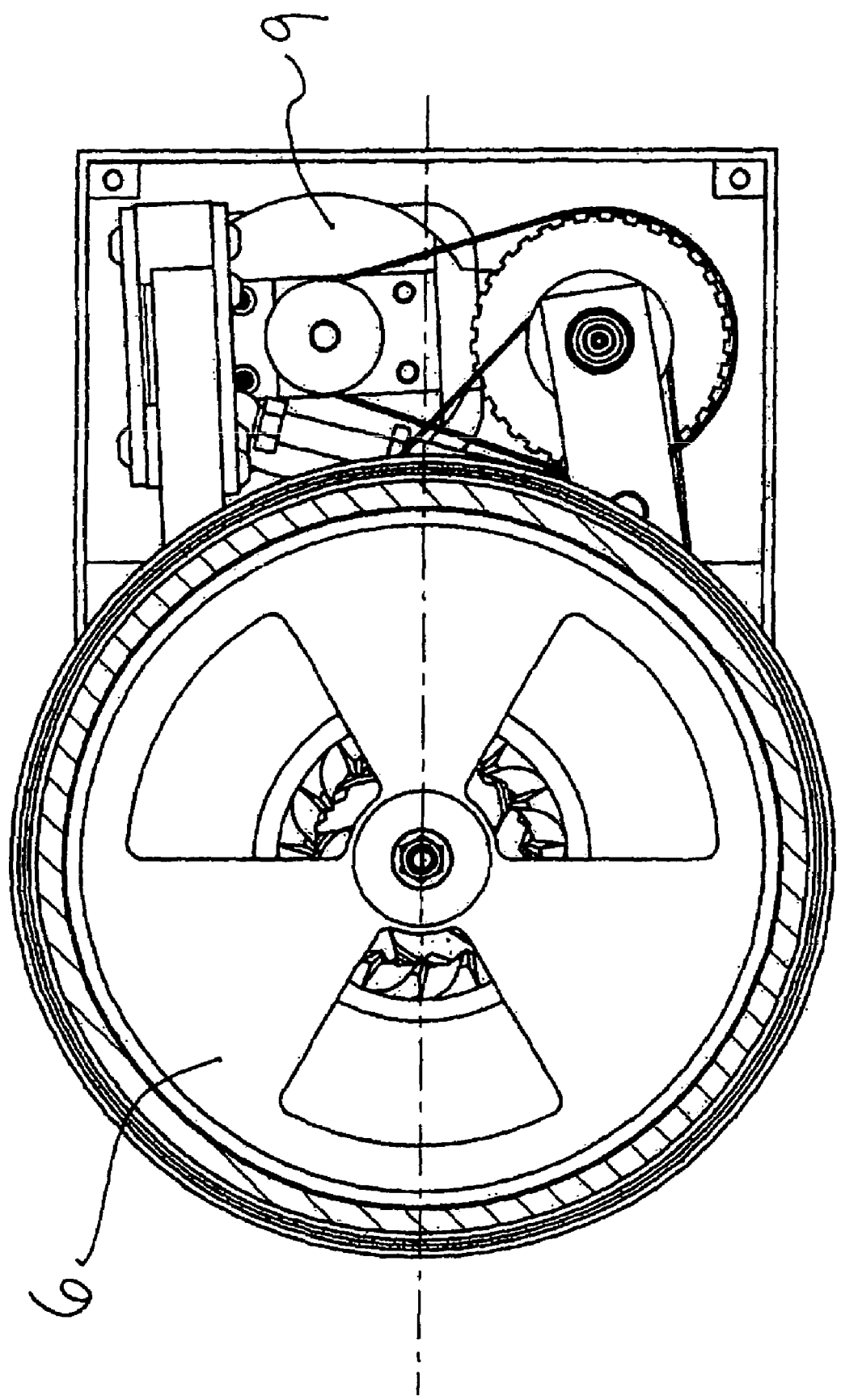
FIG. 5 shows the closing device and the knife set according to the invention, viewed from above.

It shows on FIGS. 4 and 5 that one of the conic knives is driven by an electric motor 9 by means of a hollow drive shaft, which also serves as route.

Below the conic knives is a fastening aggregate which simultaneously ensures the positioning, fastening and identification of the collection unit. The identification takes place on the basis of weight by means of a weighing cell.

By placing a collection unit, e.g. a caffetier, in the fastening mechanism the change in signal from the weighing cell form the basis for the identification of the collection unit and results in a drive of the motor for a suitable period of time during which the product is ground into the collection unit.

At the same time only the correct amount of product is ground for a given collection unit which is fastened during the process.

The route is minimized by a hollow drive shaft and the open/close mechanism is an integral part of the storage unit.

By placing the collection unit between two stationary bars where at least one end has a number of weighing cells attached, the weight of the collection unit is determined as an function of the change in the signal from the weighing cells which is registered digitally.

Figure 6A:
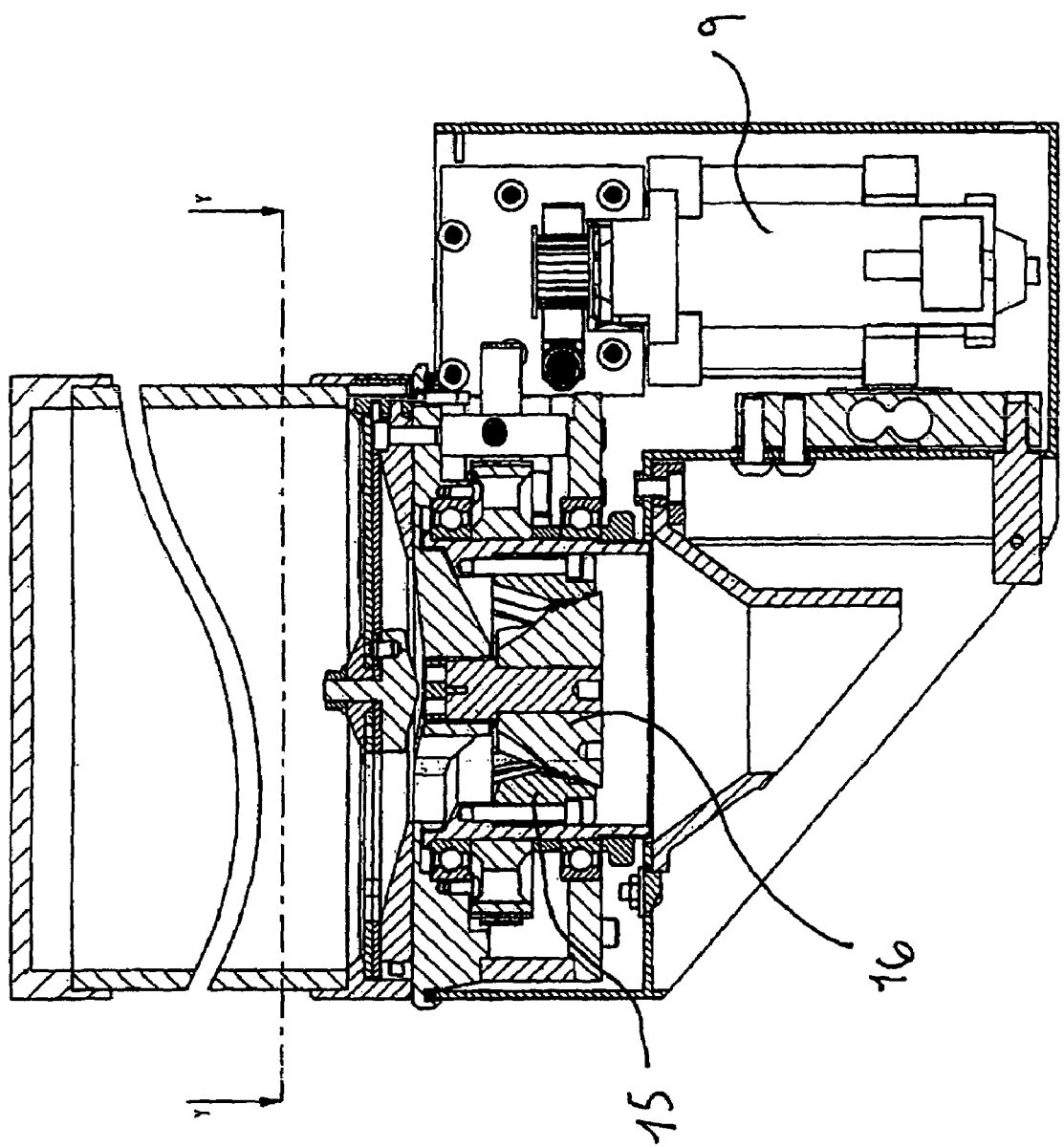
FIG. 6*a* is a cross section of the dosage device according to the invention.

FIG. 6 shows a cross section of the dosage unit where the grinding device 10 comprises an outer conic knife 15, which in the main is funnel-shaped, and an inner conic knife 16, which in the main is cone-shaped. The outer knife 15 rotates around the inner knife 16 by means of a motor 9, which is placed deaxially in relation to the centre of the grinding device 10. Hereby obtained is that the collection unit 4 may be placed directly under the grinding unit 10 and that the collection unit 2 may also be placed over the grinding device 10. The product is thereby easily moved from the storage unit 2 to the grinding unit 10 by its own weight and after finished grinding in the grinding unit 10 directly down into the collection unit 4. Moreover, this way the product is moved the shortest possible route from storage to collection and therefore touches a minimum of surface during the dosage which minimizes the risk of the product sticking to the surface inside the dosage unit 1, as is the case in known units.

In this embodiment, the outer knife is driven by a belt drive on the periphery of the outer knife however it is envisioned that in other embodiments this transfer of energy could be via cogwheel or similar. Moreover, the outer knife is envisioned driven by means of pneumatics, hydraulics or similar. It is also within the idea of the invention that unutilized energy between the dosages could be stored for later use.

By grinding the product directly into the collection unit by means of a hollow drive shaft it is possible to decreasing the oxidation of the product. In other words that the motor drives the outer knife via a drive belt.

The grinding device 10 may, in another embodiment, be placed decentrally in relation the storage unit 2 in a way that the storage can take place centrally, whereby this same storage unit 2 can be used by multiple dosage units 1. Moreover, the grinding device 10 can be placed decentrally in relation to the collection unit 4, which allows for multiple collection units 4 to be held and dosed by a single product from the same dosage unit 1 and thus utilize the capacity of the dosage unit 1 better.

The automatic dosage unit 1 may in another embodiment, not shown, also be envisaged to comprise other types of grinding devices such as a fixed blade in a chamber which is moved in relation to the blade whereby the blade is cutting through the dosed amount of the product and this way comminute the product.

Figure 6B:
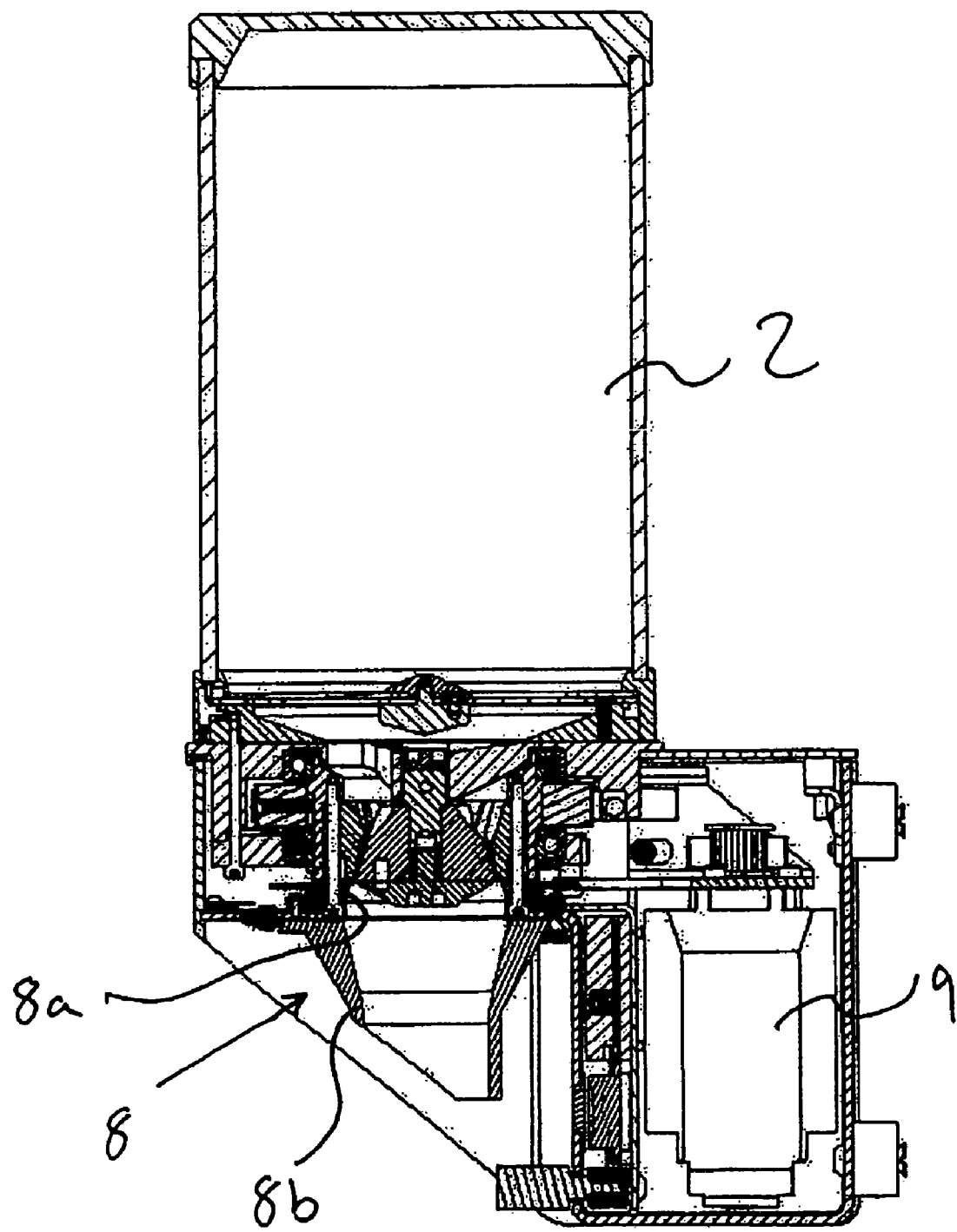
FIG. 6*b* is a cross section of another embodiment of the dosage device according to the invention.

In another embodiment of the funnel 8, shown in FIG. 6b, it is the case that it consists of two parts; the first slanting part 8a, which is the funnel part, meaning it leads the product from the knife set down into the part 8b, whereby a funnel is formed without edges and pockets in which the freshly ground coffee can get stuck. It has thus been shown that the design of the funnel 8 as per FIG. 6b ensures the coffee against static electricity as the design of the funnel 8 provides a sliding motion for the coffee down into the collection unit where the coffee, discharges itself on the way through the funnel.

In FIG. 6b is part 8b of the funnel 8 cut off at a 45 degree angle whereby it is obtained that smaller collection units may easily be used for the dosage unit. The dosage unit is thus more flexible with regards to various sizes of the collection units.

As mentioned, the storage unit is arranged to store the product, primarily coffee beans. As mentioned in the introduction, the quality of the coffee is only slowly reduced by contact with air which make is acceptable to store a certain amount.

There are however limits to how long the coffee beans can be stored before the quality is reduced. As with ground coffee, coffee beans will oxidize over time when the bag has been opened and thus have a deterioration in taste. The storage unit must therefore be of a size which allows for the unit not to require refilling too often while at the same time forcing the user to pour fresh coffee beans into the unit so no old coffee is served. A volume between 3 and 4 liters seems advantageous.

Advantageously there is no form of stagnation in the storage unit which means that there are no point within the storage unit where coffee beans are allowed to lay still when new beans are poured in. Moreover, it is preferred that the storage unit is taken off for refill as this will automatically mix the beans as well as it can be visually controlled if the unit should be cleaned.

As it must be possible to uninstall the storage unit a closing mechanism has advantageously been arranged which shuts off for the remaining beans when the storage unit is removed from the dosage unit itself.

It has proven advantageous if the storage unit is produced from a transparent material such as glass or plexi-glass.

Figure 7:
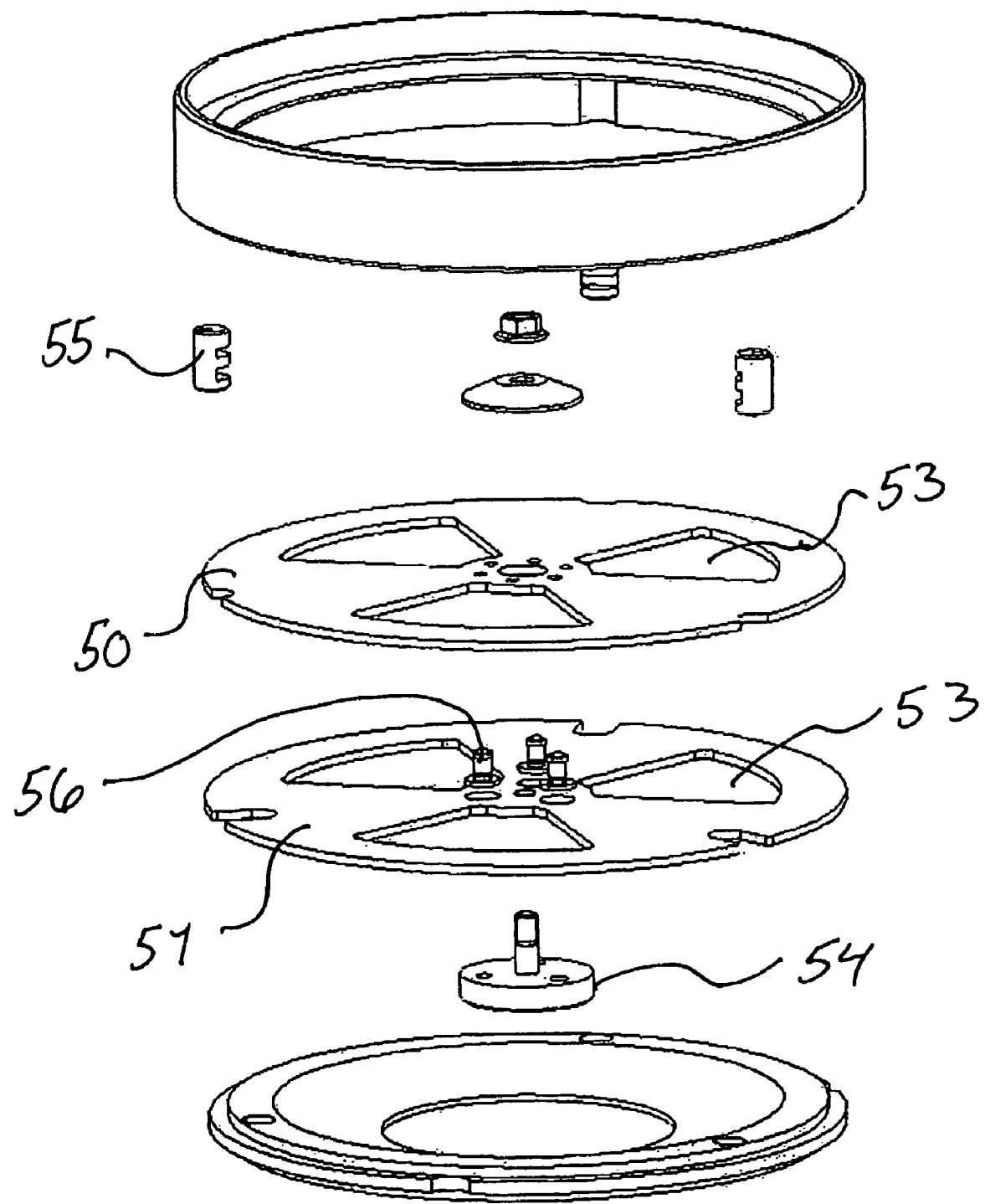
FIG. 7 is an exploded view of the closing device.
Figure 8:
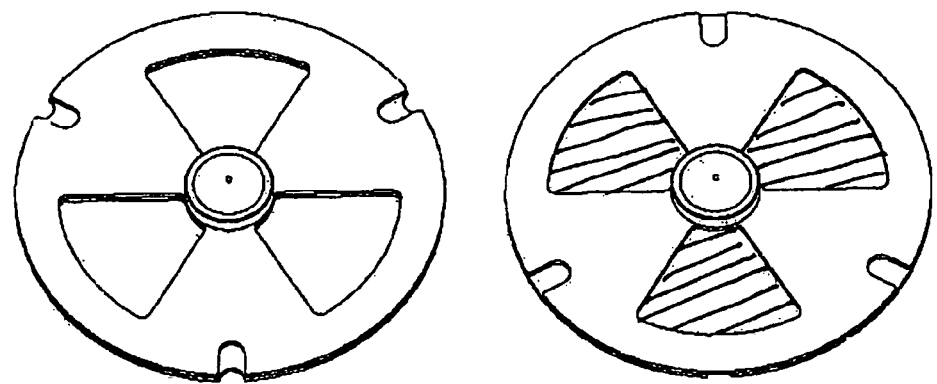
FIGS. 8-11 show detailed embodiments of the closing device.

FIG. 7 shows a split picture of a closing device according to the invention. In this embodiment, the shown device consists of two plates 50, 51 which can be connected so that they can rotate in relation to each other. The two plates are arranged with openings 53, which by rotation of the two plates can be aligned so that there is an opening from the storage unit down to the dosage unit, which can be clearly viewed on FIG. 8; on the left hand side of same figure the closing device is shown completely shut.

The closing device also consists of a handle 54 whereby the two plates can be turned in relation to each other. Moreover, there are three locking sprigs 55 arranged to grip hold of the funnel upon installation.

When using the closing device it is thus the case that it is the lower plate, which can be turned freely in relation to the rest except for three arranged pressure pieces 56 on springs which provide the plate 51 to be positioned with 60 degrees in between, which is closed or open position of the holes in the plates.

Figure 11:
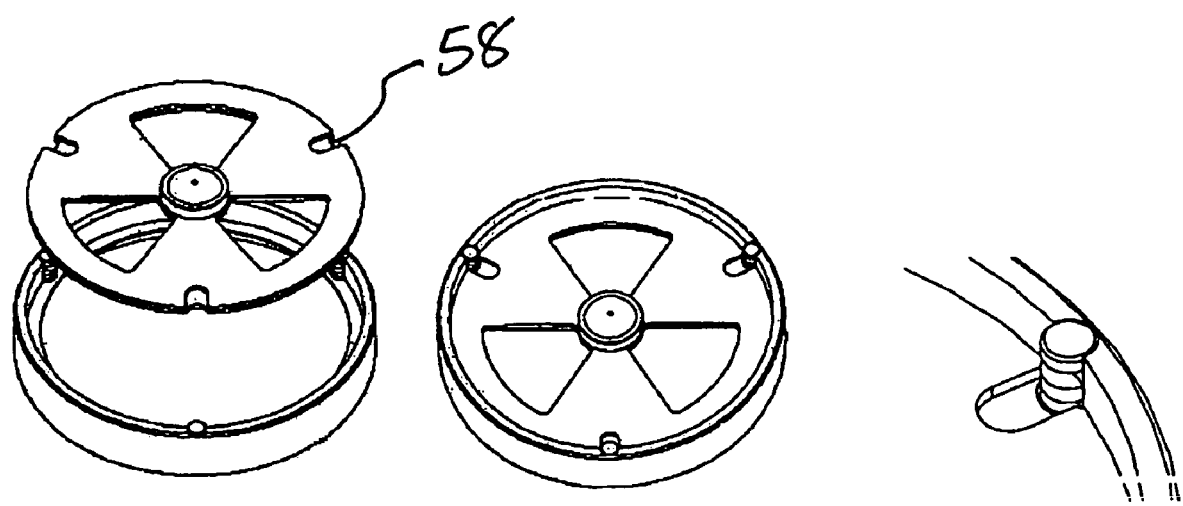

When the plates are in the open position, the holes 58 in the periphery of the plates are adjacent. This means that the connected closing device with the plates can be placed correctly by the locking sprigs, as shown in FIG. 11.

As mentioned previously, it is thus possible to turn the handle whereby the plates are closed manually. The reason why the plates close is the mutual rotation of the two plates which is caused by the bottom plate which is locked from rotation by the locking sprigs. The top plate can rotate freely in relation to the bottom plate as the top plate turns in a groove in the locking sprig. This causes also the closing device to be locked to the dosage unit.

As mentioned above it is thus obtained that in the closing mechanism a mutual rotation of the two plates happens. There are cut outs in both plates so that the plates cover each other in locked position. One of the plates is fixed in relation to the storage unit and the other plate is fixed with regards to rotation in relation to the dosage unit itself. The rotation is limited to a certain degrees by stop sprigs. It is thus obtained that the storage unit is closed when uninstalled and is opened when installed.

According to the invention it is thus the case that the closing device is an integral part of the storage unit or it can be a separate part between the storage unit and the knives. It is also the case that a steering can be arranged in connection with the closing device whereby the size, meaning the area of the opening in the plates in different rotation of the plates in relation to each other, can be varied. Hereby it is achieved that the dosage (flow) of coffee beans down to the knives can be controlled on basis of the area of the openings.

Figure 9:
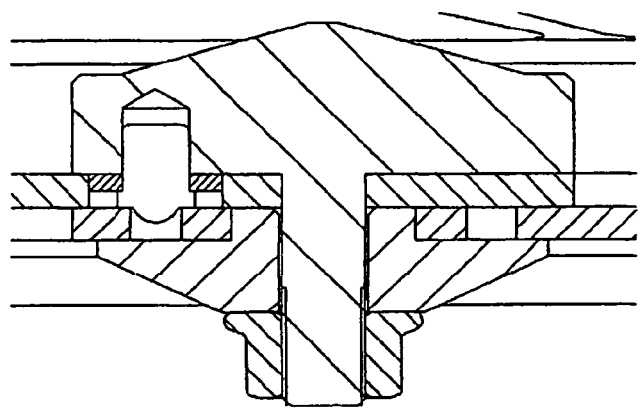
Figure 10:
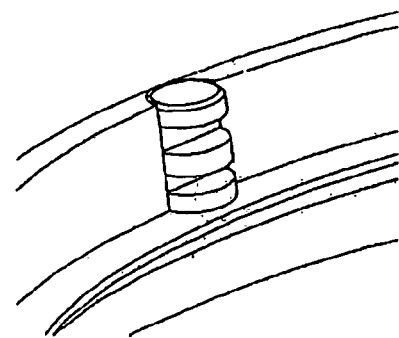

FIG. 9 shows a cut through the closing device according to the invention and FIG. 10 shows one of the three locking sprigs in an installed position.

In a preferred embodiment the dosage unit may comprise a memory unit 31, such as a computer with software, which is arranged to store information regarding the operation of the dosage unit. By fixing the collection unit 4 in position between the measuring bridge 11 and the funnel 8, the size of the collection unit 4 is identified, and the electric motor 9 is instructed by means of the software to grind the product for a given length of time. The software sorts out influences not originating from a collection unit e.g. during cleaning. In his way, the computer 31 can be pre-set for identification of different sizes of caffetiers e.g 3-cups and 8-cups, respectively, and thereby the amount of coffee to be dosed for the grinding device. Such pre-setting may optionally be changed on an ongoing basis if the quality or sort of coffee changes.

Moreover, the computer may collect data about how much time has passed since the storage unit has last been take off and thereby for how long the coffee has been stored in the storage unit. In this way, the computer can register the consumption of coffee and the amount of coffee most often dosed. Cleaning of the dosage unit can likewise be registered, or the computer can remind the user about cleaning the dosage unit. To be able to see said information in the computer on a display 30, a function in the identification device 5, as shown in FIG. 2, has been provided.

The invention further relates to use of the aforementioned automatic dosage device for the preparation and dosage of coffee.

Although the aforementioned description of the invention relates preferably to coffee beans as the product it is conceivable within the idea of the invention that the automatic dosage unit may be used for various other products in the same way; both in powder- and liquid form, such as coffee powder, tea, various soft drink concentrates etc.

Although the invention above has been described in connection with preferred embodiments of the invention, it will be evident for a person skilled in the art that several modifications are conceivable without departing from the invention as defined by the following claims.

The invention claimed is:

1. An automatic dosage unit for dispensing a particulate product into a collection unit, wherein the dosage unit comprises a grinder effective for grinding a product into a particulate product and an identification device configured to identify the size of the collection unit and dispense the particulate product based on the size of the collection unit identified, wherein the identification device comprises a fastener which fastens the collection unit to the dosage unit during dispensing of the particulate product, and the grinder comprises a set of conic knives including a funnel-shaped outer conic knife and an inner cone-shaped inner conic knife.

2. The automatic dosage unit according to claim 1, wherein the identification device further comprises a control unit to control the volume of the product dispensed in relation to the size of the collection unit.

3. The automatic dosage unit according to claim 1, wherein the dosage unit further comprises a storage unit for storage of the product.

4. The automatic dosage unit according to claim 1, wherein the dosage unit further comprises a driving device to drive the grinder.

5. The automatic dosage unit according to claim 3, wherein the storage unit is installed and uninstalled on the dosage unit by a rotary motion.

6. The automatic dosage unit according to claim 5, wherein the dosage unit further comprises a closing device located between the storage unit and an inlet to the set of conic knives.

7. The automatic dosage unit according to claim 6, wherein the closing device is an integral part of the storage unit.

8. The automatic dosage unit according to claim 6, wherein the closing device comprises at least one opening and at least one blocking device, wherein the blocking device is configured to vary the size of the opening so that the closing device can dispense different amounts of the particulate product.

9. The automatic dosage unit according to claim 8, wherein the blocking device is arranged to hermetically block the opening of the closing device.

10. The automatic dosage unit according to claim 3, wherein the dosage unit further comprises a locking device configured to lock the storage unit on the dosage unit.

11. The automatic dosage unit according to claim 1, wherein the outer conic knife is arranged to rotate around the inner knife.

12. The automatic dosage unit according to claim 1, wherein there is a play between the inner knife and the outer knife, the play facilitating the product moving down through the set of conic knives and out into the collection unit during the preparation of the product.

13. The automatic dosage unit according to claim 12, wherein the dosage unit further comprises an adjustment device arranged to adjust the degree of preparation of the product, that is, adjust the play between the knives.

14. The automatic dosage unit according to claims 3 or 13, wherein the dosage unit further comprises a safety device arranged to prevent movement of the driving device in the event the storage unit is removed from the dosage unit.

15. The automatic dosage unit according to claim 4, wherein the dosage unit further comprises a control unit arranged in connection with the driving device so that the speed of rotation can be changed and thereby the time of preparation of the product.

16. The automatic dosage unit according to claim 15, where the driving device is arranged to drive the outer knife.

17. The automatic dosage unit according to claim 1, wherein the identification of the size of the collection unit is provided by at least one device selected from the group consisting of a strain gauge, micro switch, optical sensor, weighing cell, photo identification, and telemeter.

18. The automatic dosage unit according to claim 1, wherein the dosage unit further comprises a vibration suppressor.

19. The automatic dosage unit according to claim 1, wherein the dosage unit further comprises a guiding device arranged to lead the particulate product to the collection unit.

20. The automatic dosage unit according to claim 1, wherein the dosage unit is provided with anti-static effect in a way that the particulate product can be dispensed without sticking to the unit.

21. The automatic dosage unit according to claim 20, wherein the anti-static effect is provided in the design of an outlet from the knives and the guiding device so that the particulate product is ensured a flow, whereby the particulate product is discharged on the way to the collection unit.

22. The automatic dosage unit according to claim 20, wherein the anti-static effect is provided by a treatment of surfaces of the dosage unit with which the particulate product is in contact during dispensing.

23. The automatic dosage unit according to claim 22, wherein the treatment of surfaces comprise polishing, eloxation or application of a coating.

24. The automatic dosage unit according to claim 1, wherein the dosage unit further comprises a positioning device arranged to ensure that the collection unit is placed in a predetermined position for dispensing the particulate product.

25. The automatic dosage unit according to claim 1, wherein the dosage unit further comprises a memory unit configured to store information for identification of different sizes of collection units and amounts of product dispensed.

26. An automatic dosage unit for dispensing a particulate product into a collection unit, wherein the dosage unit comprises a storage unit for storing a product, a grinder effective for grinding the product into a particulate product, an identification device configured to identify the size of the collection unit and dispensing the particulate product based upon the size of the collection unit identified, wherein the identification device comprises a fastener which fastens the collection unit during dispensing of the particulate product, and the grinder comprises a set of conic knives including a funnel-shaped outer conic knife and an inner cone-shaped inner conic knife.

27. The automatic dosage unit according to claim 26, wherein the dosage unit further comprises a memory unit configured to store information for identification of different sizes of collection units and amount of product dispensed.

28. The automatic dosage unit according to claim 26, wherein the dosage unit further comprises a closing device located between the storage unit and an inlet to the set of conic knives.

29. The automatic dosage unit according to claim 28, wherein the closing device comprises at least one opening and at least one blocking device, wherein the blocking device is configured to vary the size of the opening so that the closing device can dispense different amounts of the particulate product.

* * * * *